United States Patent [19]
Hanada et al.

[11] Patent Number: 5,964,678
[45] Date of Patent: Oct. 12, 1999

[54] INTERNALLY MOUNTED BICYCLE TRANSMISSION

[75] Inventors: Mitsugu Hanada; Akihiko Shoge, both of Shimonoseki, Japan

[73] Assignee: Shimano, Inc., Osaka, Japan

[21] Appl. No.: 08/806,198

[22] Filed: Feb. 26, 1997

[30] Foreign Application Priority Data

Apr. 22, 1996 [JP] Japan ................................ 8-099926

[51] Int. Cl.⁶ .......................... F16H 3/66; B62M 11/16
[52] U.S. Cl. .................. 475/297; 475/298; 192/217.4
[58] Field of Search .................................. 475/296, 297, 475/298; 192/6 A, 48.7

[56] References Cited

U.S. PATENT DOCUMENTS

| 854,599 | 5/1907 | Pedersen | 475/297 |
| 2,854,108 | 9/1958 | Douglas | 192/6 A |
| 2,865,478 | 12/1958 | Hood | 192/6 A |
| 4,240,533 | 12/1980 | Fukui | 192/6 A |
| 4,276,973 | 7/1981 | Fukui | 192/47 |
| 4,973,297 | 11/1990 | Bergles | 475/298 X |
| 5,078,664 | 1/1992 | Nagano | 475/297 |
| 5,322,487 | 6/1994 | Nagano | 475/297 |
| 5,399,128 | 3/1995 | Nurnberger | 475/298 |
| 5,769,750 | 6/1998 | Rickels | 475/298 |
| 5,785,625 | 7/1998 | Matsuo et al. | 475/297 |
| 5,813,937 | 9/1998 | Rickels | 475/297 |

FOREIGN PATENT DOCUMENTS

| 0 531 608A2 | 3/1993 | European Pat. Off. . |
| 57-42792 | 9/1982 | Japan . |
| 58-10711 | 2/1983 | Japan . |
| 2207966 | 2/1989 | United Kingdom . |

Primary Examiner—Richard M. Lorence
Assistant Examiner—Scott Lund
Attorney, Agent, or Firm—James A. Deland

[57] ABSTRACT

A bicycle transmission includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The ring gear includes a transmission pawl that can be displaced between a first position for transmitting rotational motion between the ring gear and the hub body and a second position for inhibiting the transmission of rotational motion between the ring gear and the hub body. A clutch is mounted around the hub axle, wherein the clutch is movable in the direction of a longitudinal axis of the hub axle for selecting a rotational force transmission path through the planetary gear mechanism and for selectively operating the transmission pawl. The clutch includes a first clutch member and a second clutch member capable of movement relative to each other in the direction of the axis of the hub axle. The first clutch member and the second clutch member move relative to each other in the direction of the axis of the hub axle when the drive member rotates in a first rotational direction for causing the transmission pawl to be in the first position for transmitting rotational motion between the ring gear and the hub body.

16 Claims, 11 Drawing Sheets

INTERNALLY MOUNTED BICYCLE TRANSMISSION

BACKGROUND OF THE INVENTION

The present invention is directed to bicycle transmissions and, more particularly, to bicycle transmissions internally mounted within a wheel hub.

A typical internally mounted bicycle transmission is disclosed in Japanese Utility Model Application 58-10711. The hub disclosed in that document includes a hub axle, a driver rotatably supported by the hub axle, and ring and planet gears serving as transmission paths for transmitting power to the hub body. A transmission pawl which may assume either an upright state or a reclined state is used to couple the rotational power from the driver to the hub body. More specifically, the transmission pawl transmits the rotational power of the driver to the hub body when the transmission pawl is in an upright state, typically through engagement of the transmission pawl with the inner periphery of the hub body, whereas the rotational power of the driver is not transmitted to the hub body when the transmission pawl is in the retracted state. An operating element for putting the transmission pawl into the upright state or the reclined state is operated by the displacement of a shifting rod in the direction of the longitudinal axis of the hub axle. In conventional hub transmissions, once the operating element is set to cause the transmission pawl to be in the upright state, the transmission pawl is maintained in the upright state regardless of whether driving power is being applied by the driver.

Most internal hubs are provided with coaster brakes, wherein the brakes are applied by reversing the rotation of the pedals. More specifically, when the rotation of the pedals is reversed and that of the driver is reversed to operate the coaster brakes, the brakes are applied to prevent rotation of the hub body. The pedals must be rotated in the forward direction to release the brakes and apply drive power to the rear wheel. However, if the transmission pawl is in an upright state, the transmission pawl may engage the hub body while the brakes are applied. Since the brakes prevent forward rotation of the hub body, and since the pedals are coupled to the hub body through the transmission pawl, the pedals cannot be rotated forward to release the brakes. This results in the problem referred to as brake lock, where the brakes cannot be released.

Another problem is caused by the constant engagement of the pawl with the hub body when the bicycle rolls back on an incline such as a hill. In this case the rotation of the wheel is transmitted by the pawl to the planetary gear mechanism and prevents the coaster brake from operating unless the cyclist can rotate the pedals backwardly at a faster rate than the wheels. In reality the coaster brake is almost impossible to operate in this situation.

Even in bicycles which are not equipped with coaster brakes, when the transmission pawl is brought into contact with the hub body during the reverse rotation of the driver, the transmission pawl comes into contact with the hub body, resulting in the problem of noise.

SUMMARY OF THE INVENTION

The present invention is directed to an internally mounted bicycle transmission which does not suffer from brake lock, which allows the brakes to be applied when rolling backwards and which is quiet when the pedals are rotated in the reverse direction. In one embodiment of the present invention, a bicycle transmission includes a hub axle, a drive member rotatably mounted around the hub axle, a hub body rotatably mounted around the hub axle, and a planetary gear mechanism coupled between the drive member and the hub body for communicating rotational force from the drive member to the hub body through multiple rotational force transmission paths. The planetary gear mechanism includes a planet gear supported by a planet gear rack for rotation around the hub axle, and a ring gear engaging the planet gear. The ring gear includes a transmission pawl that can be displaced between a first position for transmitting rotational motion between the ring gear and the hub body and a second position for inhibiting the transmission of rotational motion between the ring gear and the hub body.

A clutch is mounted around the hub axle, wherein the clutch is movable in the direction of a longitudinal axis of the hub axle for selecting a rotational force transmission path through the planetary gear mechanism and for selectively operating the transmission pawl. The clutch includes a first clutch member and a second clutch member capable of movement relative to each other in the direction of the axis of the hub axle. The first clutch member and the second clutch member move relative to each other in the direction of the axis of the hub axle when the drive member rotates in a first rotational direction for causing the transmission pawl to be in the first position for transmitting rotational motion between the ring gear and the hub body. On the other hand, the first clutch member and the second clutch member move relative to each other in a different direction when the drive member rotates in a second rotational direction for causing the transmission pawl to be in the second position for inhibiting the transmission of rotational motion between the ring gear and the hub body.

In a more specific embodiment, the first clutch member includes a first contact surface for contacting the transmission pawl and causing the transmission pawl to be in the second position, and the second clutch member includes a second contact surface for contacting the transmission pawl and causing the transmission pawl to be in the second position. Furthermore, the first clutch member includes a first engagement component and the second clutch member includes a second engagement component having an inclined surface. The first engagement component slides against the inclined surface of the second engagement component when the drive member rotates in the first rotational direction to cause the first clutch member and the second clutch member to move away from each other in the direction of the axis of the hub axle so that neither the first contact surface nor the second contact surface contacts the transmission pawl, thereby causing the transmission pawl to be in the first position. Additionally, the inclined surface of the second engagement component is shaped so that the first clutch member and the second clutch member move toward each other in the direction of the axis of the hub axle when the drive member rotates in a second rotational direction so that at least one of the first contact surface or the second contact surface contacts the transmission pawl to cause the transmission pawl to be in the second position. If desired, the transmission can be constructed so that neither the first contact surface nor the second contact surface contacts the transmission pawl only when a predetermined rotational force transmission path through the planetary gear mechanism (such as a top gear path) is selected.

BRIEF DESCRIPTION OF THE DRAWINGS

FIG 13b is a view taken along line F—F in FIG. 13a; and

FIG. 13c is a view taken along line G—G in FIG. 13a.

DETAILED DESCRIPTION OF THE EMBODIMENTS

Figure 1:
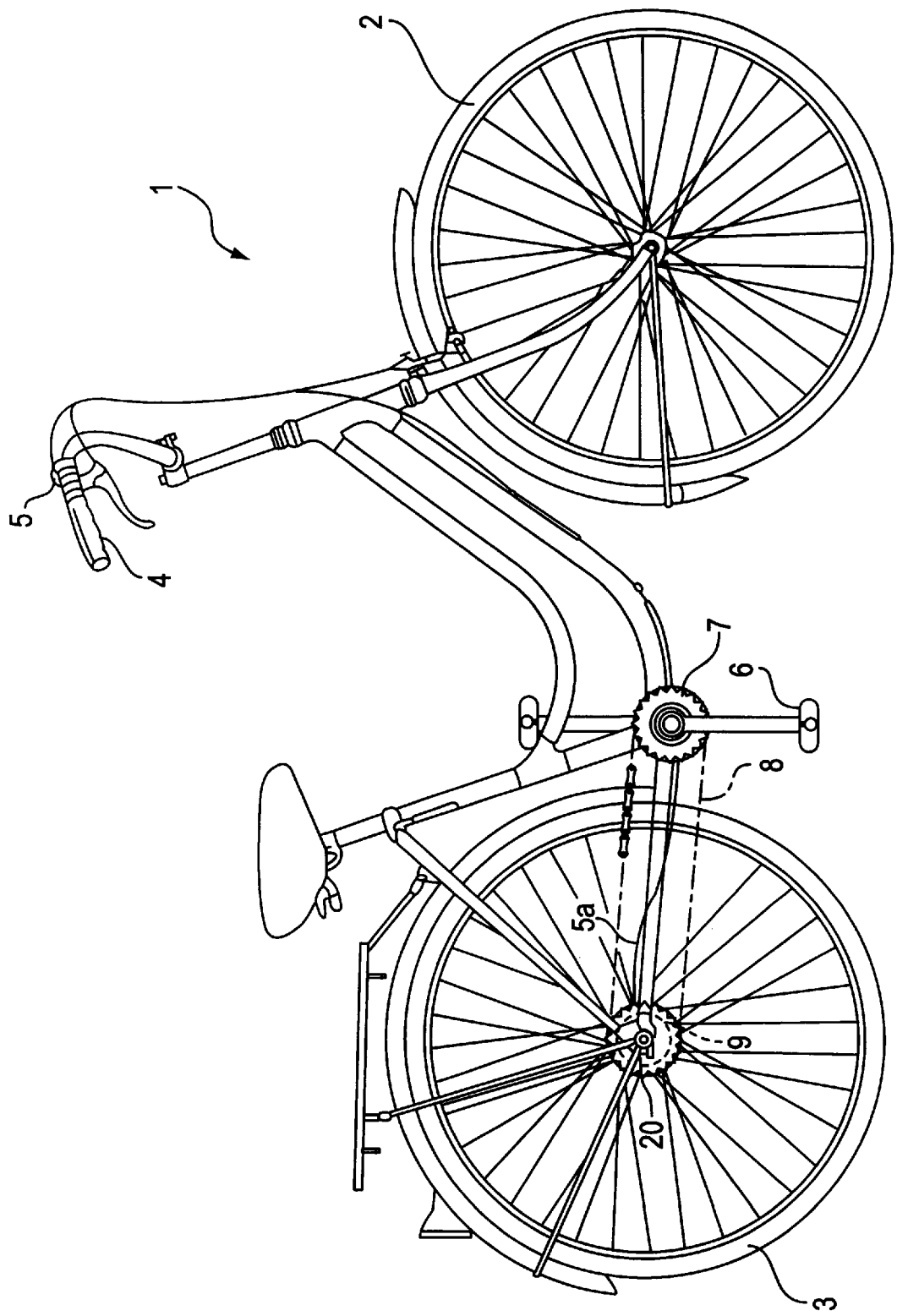
FIG 1 is a side view of a bicycle.

FIG. 1 shows a bicycle 1 in which the internal hub 9 of the present invention is installed. Here, 2 is the front wheel, 3 is the rear wheel, 4 is the handlebar, 5 is a shifter that shifts the internal hub 9, and 5a is a cable that is pulled by the shifter 5. 6 is a pedal, and the drive force of the pedals 6 is transmitted to the internal hub 9 via a front chain wheel 7, a chain 8, and the sprocket 20 of the rear wheel 3. In the description that follows, the rotational direction of the pedals and other rotatable parts corresponding to the forward direction of the bicycle I will be called the first rotational direction or forward pedalling direction, and the opposite direction will be called the second rotational direction or back pedalling direction.

When the pedals 6 are rotationally operated in the first rotational direction, the drive force thereof is transmitted to the rear wheel 3 at a speed-down or speed-up ratio corresponding to the speed step set by the shifter 5. There are three speed steps in this embodiment, and switching is possible between a first speed position (top position), a second speed position (neutral position), and a third speed position (low position). Further, when the pedals 6 are rotationally operated in the reverse direction, a coaster brake mechanism housed in the internal hub 9 is actuated, and a braking force acts on the rear wheel 3.

Figure 2:
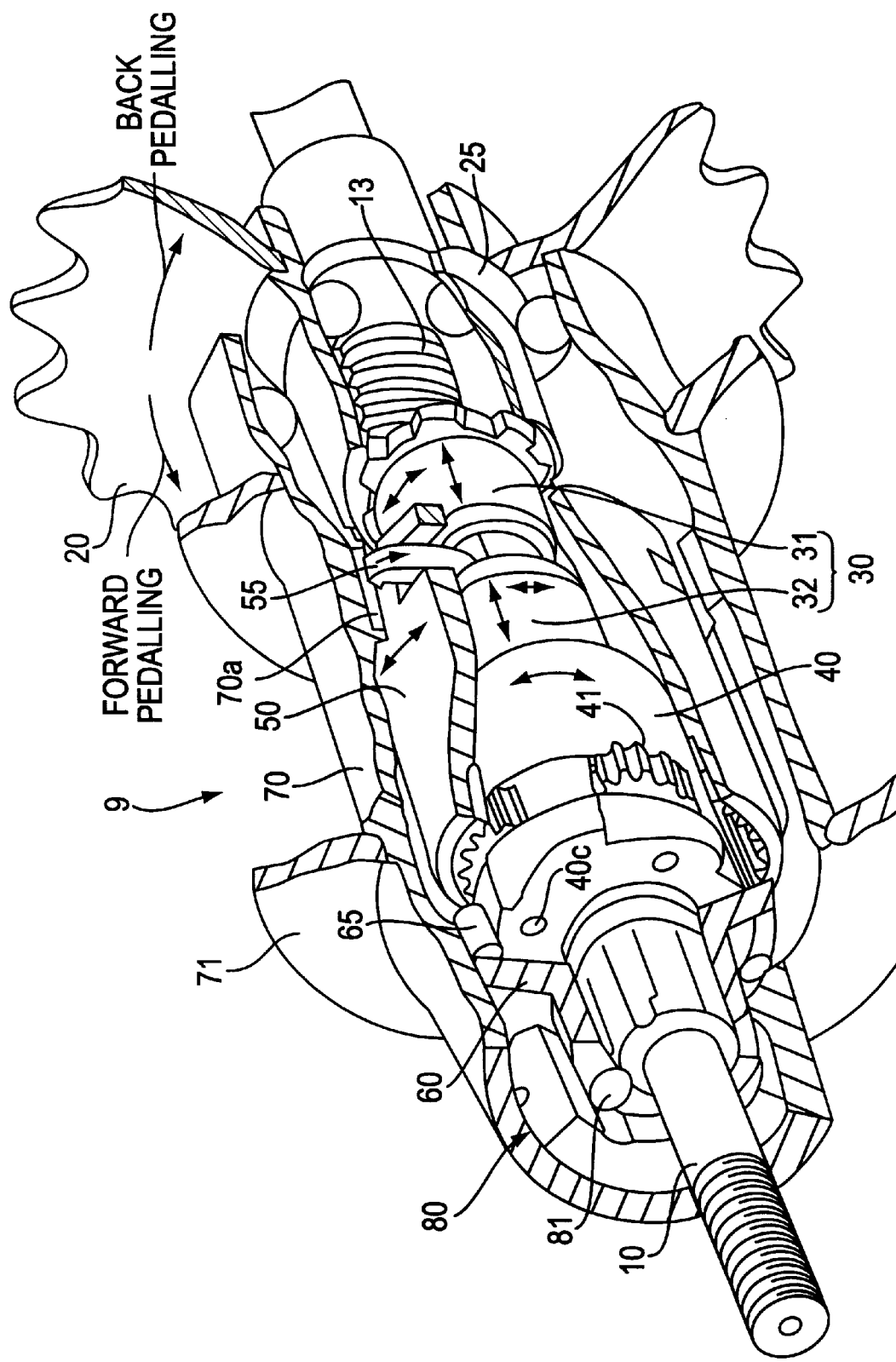
FIG 2 is a partial cut away view of a particular embodiment of a bicycle transmission according to the present invention.

The internal shifter pertaining to the present invention will now be described in detail through reference to the figures. As shown in an overview in FIG. 2, this internal shifter comprises a hub axle 10, a driver 25 that is rotatably supported by the hub axle 10 and fixes the sprocket 20, a hub body 707 that fixes the spokes of the wheel of the bicycle and is rotatably supported with respect to the hub axle and the driver 25, a gear mechanism that is interposed between the driver 25 and the hub body 70 and includes a planet gear for transmitting the drive force from the driver 25 to the hub body 70 through a plurality of drive paths, a clutch means for selecting among the plurality of transmission paths, and so on.

In the description that follows, the "axial direction" refers to the same direction as the axis X of the hub axle 10. The "first end in the axial direction" refers to the hub axle end 10c on the right side in FIG. 3, while the "second end" refers to the left end 10d of the hub axle 10 on the opposite side. The "radial direction" or "peripheral direction" is the radial direction or peripheral direction with respect to the hub axle 10.

The hub axle 10 is fixed to the frame fork 1a of the bicycle. The driver 25 is rotatably supported with respect to the hub axle 10 via a bearing mechanism. This bearing mechanism is provided in the region at one end of the hub axle 10, and it consists of a ball race 10a that forms the large diameter component of the hub axle 10, a plurality of balls 11 provided in the peripheral direction of the hub axle 10, and a bearing surface 25a provided to the inside in the radial direction of the driver 25 and to the outside in the axial direction of the hub axle 10. Therefore, the plurality of balls 11 are sandwiched between the bearing surface 25a of the driver 25 and a bearing surface 10b that is on the outside in the radial direction of the ball race 10a and faces inward in the axial direction.

The driver 25 is in the overall form of a cylinder that extends in the axial direction, and it fixes the sprocket 20 engaged with the chain 8 to the axial direction first end (10c). A ring-shaped cover 12 is provided between the driver 25 and the hub axle 10 in order to prevent dust, grit, and the like from getting into the internal shifter. The portion of this cover 12 on the inside in the radial direction is fixed to the hub axle 10, and the portion on the outside in the radial direction hits the driver 25 and thereby blocks the gap formed between the hub axle 10 and the driver 25.

The surface on the outside in the radial direction of the driver 25 is provided with a bearing surface 25b that serves as a cone and is in contact with balls 26 that are used to rotatably support the hub body 70. A spline 25c that is used to engage a clutch 30 (discussed below) is provided on the inside in the axial direction of the bearing surface 25a. This spline 25c extends in the axial direction from the end 25e on the inside in the axial direction of the driver, and the length thereof is at least half the length in the axial direction of the driver 25.

The hub body 70 is in the overall form of a cylinder that covers nearly the entire length of the hub axle 10, and it is rotatably supported by balls 26 with respect to the driver 25 on the side of the first end in the axial direction. A cover 27 that is used to cover the gap formed between the hub body 70 and the driver 25 is provided between these two members, and it is fixed with respect to the driver 25. The second end side of the hub body 70 is equipped with a similar bearing mechanism, which is rotatably supported on the hub axle 10 by balls 26b.

A gear mechanism transmits the drive force from the driver 25 to the hub body 70 via a plurality of drive paths. This gear mechanism is made up of a clutch 30 that engages with the driver 25, an operating unit (discussed below) that is used to operate the clutch 30, a sun gear 99 provided around the outer periphery of the hub axle 10, a planet gear 41 that engages with this sun gear 99 and rotates while revolving around the hub axle 10, a planet gear rack 40 that supports this planet gear 41, a ring gear 50 positioned on the outside in the radial direction of the planet gear, and a transmission pawl 55 that oscillatably pivots with respect to this ring gear 50 and that is capable of transmitting the drive force with respect to the hub body 70.

The clutch 30 is made up of two parts, namely, a first clutch 31 and a second clutch 32 that is separate from the first clutch 31. These two parts are able to move integrally in the axial direction and in the peripheral direction, and are also capable of relative displacement in the axial direction. A clutch operating unit that includes a first shift key 100 is what moves and operates this clutch 30. The first clutch 31 is engaged with the driver 25. The first clutch is also able to come into contact with a transmission pawl 55, and when it hits the end 55b of this transmission pawl 55, it knocks down this transmission pawl 55 and makes possible the disengagement of the transmission pawl 55 from the hub body 70. The second clutch 32 can be engaged with both the planet gear rack 40 and the ring gear 50, and movement of the second clutch in the axial direction results in engagement of either the gear rack 40 or the ring gear 50. The planet gear rack 40 is engaged with the ring gear 50, and it transmits to the ring gear 50 the drive force that has been transmitted through the clutch 30. Ring gear 50 further transmits this drive force through the transmission pawl 55 to the hub body 70. Alternatively, planet gear rack 40 receives the drive force from the ring gear 50 and transmits it to the hub body 70 via a roller clutch mechanism 65.

In this embodiment, movement of the clutch 30 between first, second, and third positions at intervals in the axis X direction on the hub axle 10 makes three speeds possible, namely, top (the first speed step), neutral (the second speed step), and low (the third speed step). This clutch 30 is energized overall in the second end direction of the hub axle 10, that is, in the direction of the first shift key 100, by a first energizing spring 13.

The first clutch 31 is in the overall form of a cylinder that extends in the axial direction, and a plurality of teeth 31a that engage with the driver 25 are provided to the outer peripheral surface in the first axial end direction. The second clutch 32 has an engagement pawl 32a that engages with the ring gear 50 or the planet gear rack 40 on the outer peripheral surface in the second axial end direction. When this second clutch 32 is moved over the hub axle 10 in the axial direction along with the first clutch 31, the engagement pawl 32a engages with the gear rack 40, or engages with the ring gear 50. The first shift key 100 moves and operates the entire clutch 30 by moving this second clutch 32.

Figure 3:
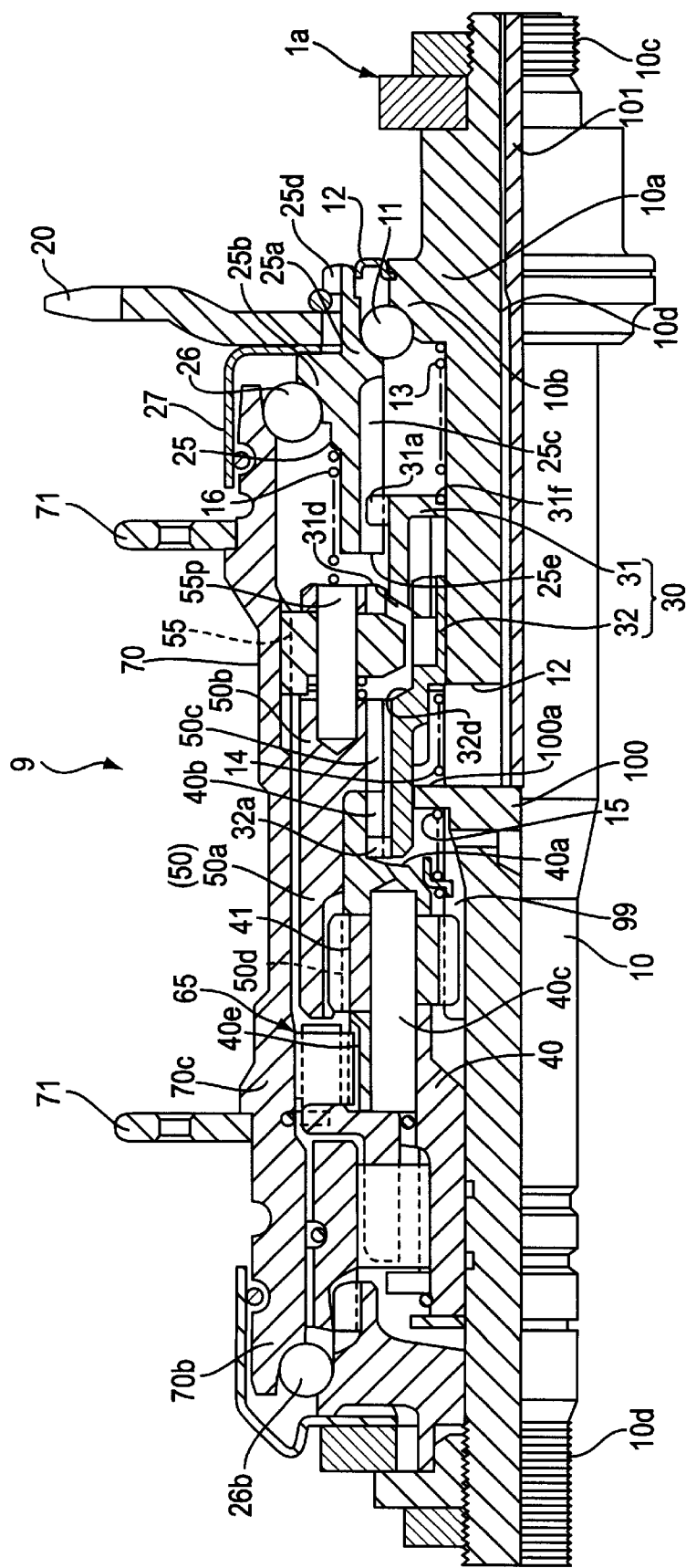
FIG 3 is a partial cross sectional view of the transmission shown in FIG. 2.

As shown in FIG. 3, first shift key 100 passes through a groove 12 made in the hub axle 10 such that it intersects the axis X thereof in the radial direction, and it is operated from the outside of the internal shifter by bringing the hub axle 10 into contact with an operating bar 101 positioned in a hole 10d made in the axis X direction. As shown in FIG. 3, this operating bar 101 is only in contact with the end on the second end side and with the first shift key 100 in the center in the lengthwise direction of the first shift key, and is not linked. Therefore, the operating bar 101 is able to push the first shift key toward the second end, but it is unable to pull the first shift key 100 toward the first end. Therefore, movement toward the first end is accomplished by the energizing force of a third energizing spring 15 (discussed below).

The length of the first shift key 100 in its lengthwise direction is greater than the diameter of the hub axle 10, and when the first shift key 100 is inserted into the groove 12 of the hub axle 10, it protrudes from the outer peripheral surface of the hub axle 10 by a protrusion portion 100a. This protrusion portion 100a hits the second clutch.

As noted above, the clutch 30 is energized in the direction of the first shift key 100 by the first energizing spring 13. One end of this first energizing spring 13 is in contact with the lateral surface of the above-mentioned large diameter portion 10a of the hub axle 10, and the other end is in contact with a first spring engagement groove 31f provided to the inner peripheral surface on the first end side of the first clutch 31. As a result, the clutch 30 moves in the direction of the first shift key 100 until the clutch 30 reaches equilibrium with the operating force of the first shift key 100 and is positioned at the desired speed step.

As shown in FIG. 3, a second energizing spring 14 is provided around the outer periphery of the hub axle 10 at a position between the first shift key 100 and the second clutch 32. The length of this second energizing spring 14 is set by a spring setting washer such that the resulting set length will be such that when the first shift key 100 is moved in the direction of the second clutch 32, it will hit the second energizing spring 14 before the second clutch 32. A third energizing spring 15 that energizes the first shift key 100 in the direction of the second clutch is provided on the hub axle 10. The third spring acts as an assist spring that boosts the operating force when the first shift key 100 is exerting an operating force on the clutch. The spring coefficients of the first energizing spring 13 and the second energizing spring 14 are set to be roughly equal, while the spring coefficient of the third energizing spring 15 is set to be greater-than the first and second springs. Therefore, when the shifter control 5 attached to the handle bar is operated and the inner cable pulled, the first shift key 100 will move in the second end direction against the energizing force of the third energizing spring via the operating bar 101. Conversely, when the inner cable is operated so that it is relaxed, the first shift key 100 will be moved in the direction of the second clutch 32 by the energizing force of the third energizing spring. When separation resistance is low, the spring force of the third energizing spring 15 will overcome the spring force of the first and second energizing springs and displace the clutch 30.

The first and second clutches, which are main structural elements of the clutch 30, are rotatable relative to each other in the axial direction, but this is because drive power from the driver 25 is transmitted via the transmission pawl 55 to the hub body 70 as a result of the transmission pawl 55 (described below) engaging with the hub body only during shifting to the first speed step by means of the shift control 5.

Figure 4:
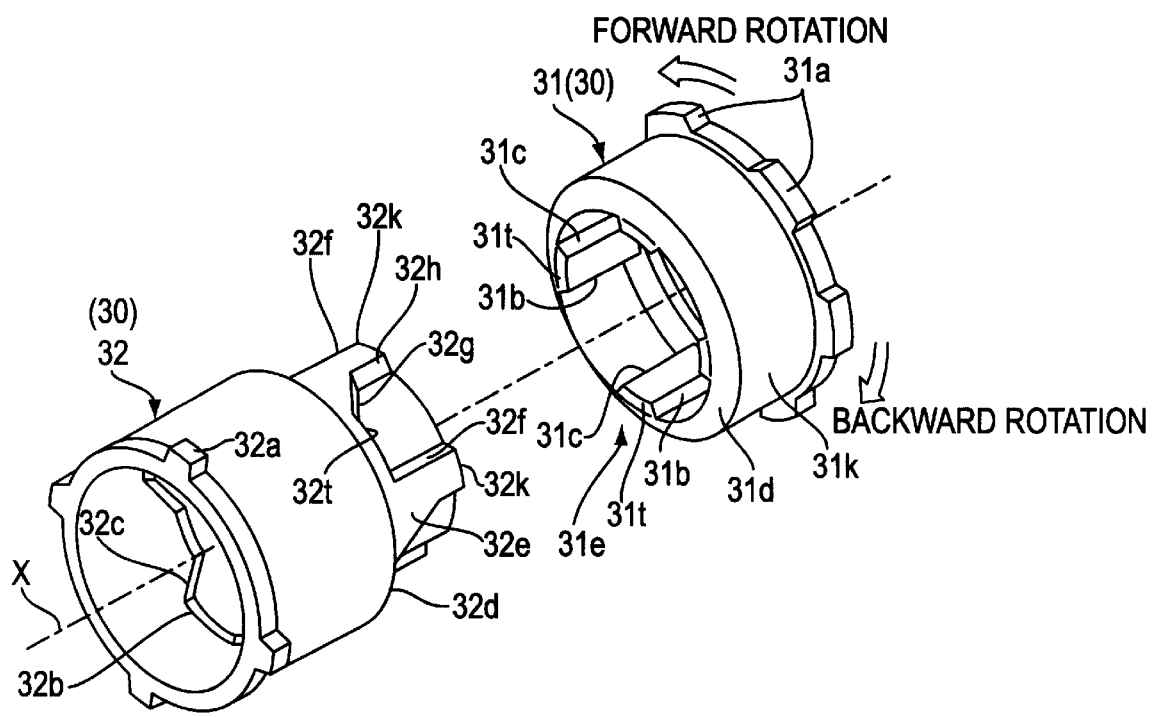
FIG 4 is an exploded view of a particular embodiment of a clutch according to the present invention.

The linkage of the first clutch 31 and the second clutch 32, which are structural elements of the clutch 30, will now be described with reference to FIG. 4. As shown in FIG. 4, a plurality of engagement components 31e that protrude in the radial direction are formed on the inner peripheral surface of the first clutch 31. These engagement components 31e are approximately rectangular protrusions that extend parallel to the axis X direction, and flat surfaces 31b and 31c are formed on both sides thereof. On the first end side of the second clutch 32 are formed engaging components 32e that are inserted on the inner periphery on the second end side of the first clutch 31 and over which the above-mentioned engagement components 31e are able to slide. A plurality of leg components 32k are formed on the first end side of the engaging components 32e, and each of the above-mentioned leg components 32k forms a flat surface component 32f that extends parallel to the axial direction, an inclined surface 32g that is inclined in the axial direction, and an extension surface 32h that extends from this inclined surface and parallel to the axis X direction.

As shown in FIG. 4, the end surface 31t on the second end side of the first clutch 31 is linked to a cylinder component 31k by a step component 31d that corresponds to a first contact surface which inclines toward the outer peripheral surface 31k of the cylinder in a side view. The same holds true for the second clutch 32. More specifically, a step component 32d that corresponds to a second contact surface which inclines in the axis X direction is formed in the approximate middle of the outer peripheral surface of the second clutch 32.

In a state in which the internal hub 9 of the present invention is installed on the bicycle 1, the first clutch 31 is energized to the second end side by the first energizing spring (see FIG. 3) in a state in which no drive force is produced at the pedals, while the clutch 30 is maintained at its shortest length in the axis X direction in a state in which the end surface 31t on the second end side of the first clutch 31 is in contact with the base component 32t of a leg component 32k of the second clutch 32. Next, when a drive force in the forward direction of the bicycle acts on the pedals in this state, the driver 25 rotates in the first direction, or forward pedalling direction, and the first clutch 31 linked thereto rotates in the same direction. When the drive force in the forward pedalling direction is transmitted to the first clutch 31, the flat surface 31b side of the engagement component 31e is in contact with the inclined surface 32g of the second clutch 32, and when drive force in the same direction is continuously imparted, the second end side of the above-mentioned engagement component 31e slides over the above-mentioned inclined surface 32g, as a result of which the first clutch 31 moves toward the first end relative to the second clutch 32. When the flat surface 31b of the engagement component 31e hits the extension surface 32h of the second clutch 32, no force component that would separate the flat surface 31b and the extension surface 32h is generated between them, so the movement of the first clutch 31 in the axial direction with respect to the second clutch 32 comes to a halt, and the drive force transmitted to the first clutch 31 is conveyed to the second clutch 32.

As a result of the first clutch 31 and the second clutch 32 being thus structured, the drive force in the first rotational direction transmitted to the sprocket 20 causes the first clutch 31 to move away from the second clutch 32 toward the first end in the axial direction.

Consider a case in which a drive force is produced in the opposite direction from the first direction. In this case, the flat surface 31c on the side around the back pedalling direction in FIG. 4 of the engagement component 31e of the first clutch 31 is in contact with the flat surface 32f side of the second clutch 32, and the first clutch 31 drives the second clutch 32 in the back pedalling direction, which is the opposite of the forward pedalling direction. If a drive force in the back pedalling direction should act on the pedals in a state in which the flat surface 31b of the first clutch 31 is in contact with the extension surface 32h of the second clutch 32, then the flat surface 31b of the first clutch 31 that was in a state of contact immediately separates from the extension surface 32h, so the energizing force of the first energizing spring toward the second end component causes the first clutch 31 to move toward the second clutch 32. Thus, when a drive force in the reverse direction (the second rotational direction) acts on the pedals 6, the first clutch 31 moves toward the second end component of the second clutch 32, so the clutch 30 is displaced in the axis X direction to a state in which it is contracted to its shortest length.

The operation of the transmission pawl 55 by the clutch 30 will now be described.

Serrations 40b that extend in the axial direction are provided on the inside in the radial direction of the first end side of the planet gear rack 40. When the clutch 30 is in its first position corresponding to the first speed step and in its second position corresponding to the second speed step, the engagement pawl 32a provided on the outside in the radial direction of the second clutch 32 engages with these serrations 40b. Therefore, the length of these serrations 40b in the axial direction is roughly the same as or slightly greater than the amount of displacement in the axial direction of the clutch 30 in the first and second speed steps. The planet gear 41 is rotatably supported by the shaft 40c of this gear rack 40. This gear rack 40 is itself fitted on the outside of the hub axle 10 such that it is free to rotate.

The ring gear member 50 is in the overall form of a cylinder that extends in the axial direction, and it is made up of a cylinder component 50a that engages with the planet gear 41, and a support component 50b that supports the transmission pawl 55. As shown in FIG. 3, a pressing spring 16 that is used to fix the ring gear member 50 to a position in the direction of the second end is provided between the ring gear member 50 and the driver. A gear component that engages with the planet gear 41 is provided on the inside in the radial direction of the cylinder component 50a, and two windows in which are fixed a pin 55p (which is the support shaft that supports the transmission pawl 55 such that it can oscillate) are provided to the support component 50b. Serrations 50c that are used to engage the engagement pawls 32a when the clutch is in its third position corresponding to the third speed step are provided on the inside in the radial direction of this support component 50b.

The transmission pawl 55 acts as a one-way mechanism that is energized in the direction of engagement with the engagement teeth 70a provided to the hub body 70 by an energizing spring attached around the pin 55p provided to the support component 50b of the ring gear member 50, and it is capable of displacement between an upright state in which it is engaged with the hub body 70 and a reclined state in which it is disengaged. This transmission pawl 55 has a pawl component 55a that engages with the engagement teeth 70a of the hub body 70, and a first contact component 55b that comes into contact with the first clutch 31, or a second contact component 55c formed as a cam face that comes into contact with the second clutch 32. When the first clutch 31 or the second clutch is in contact with the transmission pawl 55, this contact portion is pushed up to the outside in the radial direction, and the transmission pawl 55 enters its reclined state.

A detailed description is given with reference to FIGS. 5 through FIGS. 13a, 13b and 13c. The step component 31d of the first clutch can come in contact with the first contacted component 55b of the aforementioned transmission pawl 55. When assembled in the internal hub 9, the first clutch 31 moves in the axial direction and the step component 31d comes into contact (from the first end side) with the first contacted component 55c of the transmission pawl 55, allowing the transmission pawl 55 to be operated in such a way as to swing around the pivot shaft 55p. As shown in detail in FIG. 13b, inclined surfaces 55b1 and 55b2 are provided to convert power in the axial direction to rotating power in the axis X direction when the first contacted component 55b of the transmission pawl 55 comes into contact with the step component 31d of the first clutch 31. That is, when power in the axis X direction acts on the inclined surfaces 55b1 and 55b2, power is produced in the direction perpendicular to the inclined surface 55b1, so this perpendicular power has a component of power in the direction that swings the transmission pawl 55 around the pivot shaft 55p. The transmission pawl 5 is accordingly swung by this component of power around the pivot shaft 55p.

The same is true of the second clutch 32. More specifically, a step component 32d (corresponding to a second contact surface) which inclines in the axis X direction is formed virtually in the middle of the outer peripheral surface of the second clutch 32. When the second clutch 32 moves from the second end side to the first end side in the direction of the axis X so that the step component 32d comes into contact with the second contacted component 55c of the transmission pawl 55, power that swings the transmission pawl 55 around the pivot shaft 55p is produced by the plurality of inclined surfaces 55c1 and 55c2 (FIG. 13c) of the second contacted component 55c, allowing the transmission pawl 55 to swing. Here, the inclined surfaces 55c1 and 55c2 are also formed, in the same manner that the inclined surfaces 55b1 and 55b2 were, into a shape allowing the power in the axis X direction to relieve the power that swings the transmission pawl 55 around the pivot shaft 55p.

In this way the transmission pawl 55 can be switched between an upright state and reclined state, depending on what position in the axial direction the first clutch 31 and second clutch 32 are in. However, it is only when the end of the contacted side of the transmission pawl 55 is aground on the cylinder component 31k of the first clutch 31 or the cylinder component 32k of the second clutch 32 that the transmission pawl 55 remains in a reclined state, even when the first clutch 31 and second clutch 32 are moved in the axis X direction.

In this embodiment, movement of the clutch 30 between first, second, and third positions at intervals in the axis X direction on the hub axle 10 makes three speeds possible, namely, top (the first speed step), neutral (the second speed step), and low (the third speed step).

Figure 5:
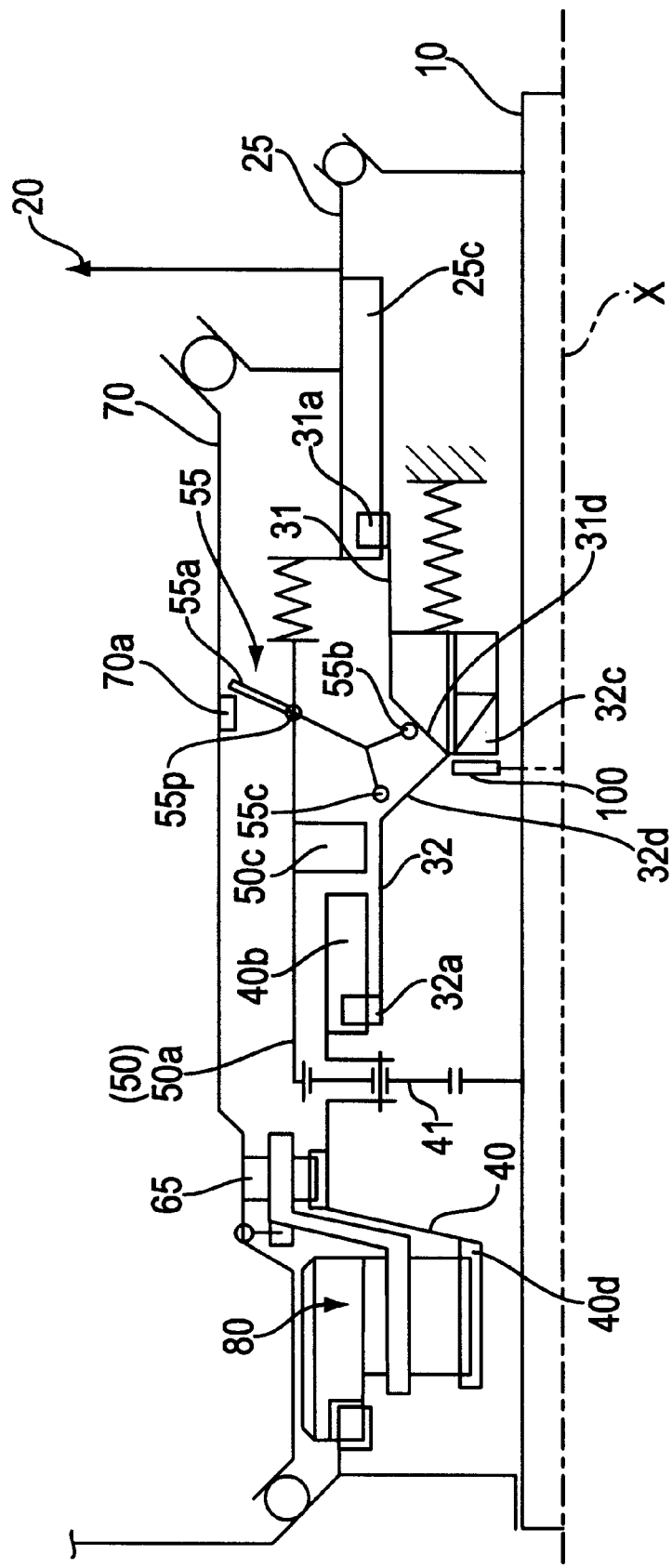
FIG 5 is a schematic representation of the transmission components in a top gear position before drive power is applied.
Figure 6:
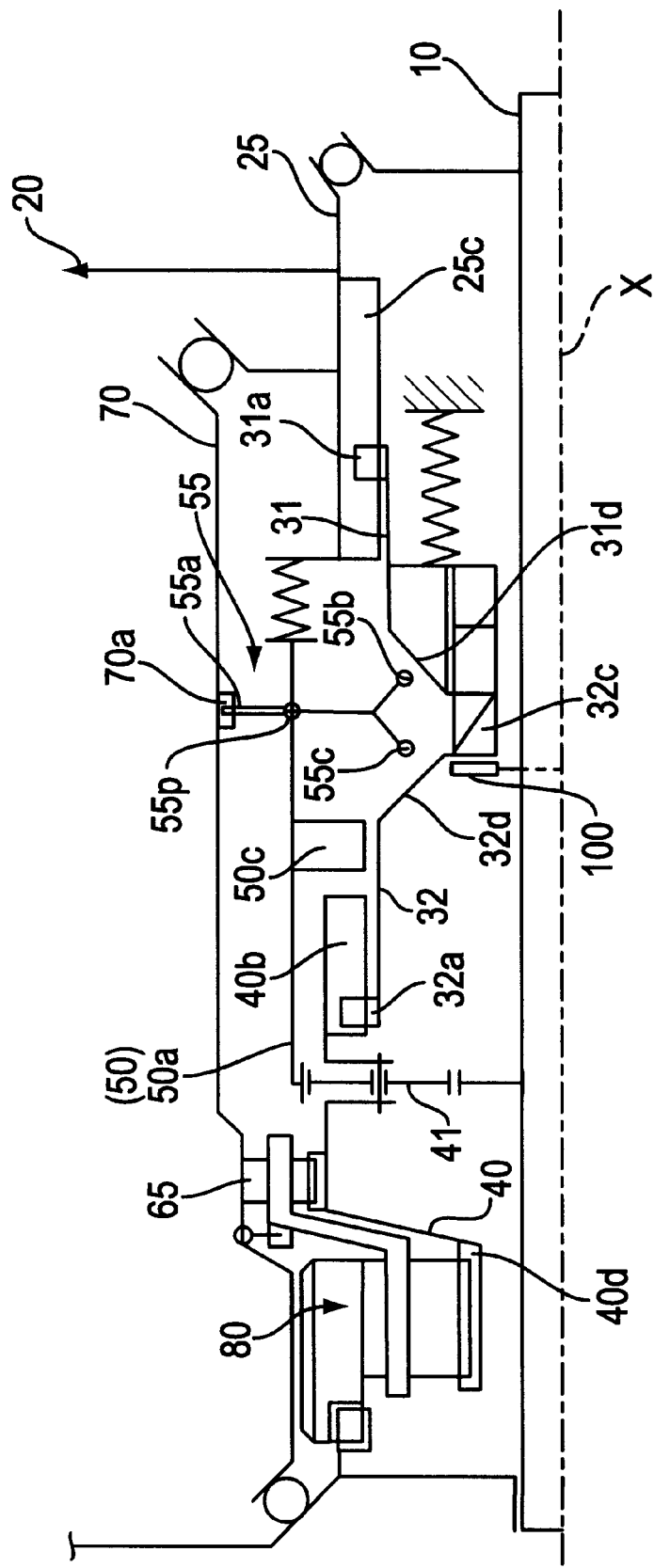
FIG 6 is a schematic representation of the transmission components in a top gear after drive power is applied.

The shifter 5 is operated and the inner cable pulled, which causes the shift key 100 to move via the operating bar 101 against the energizing force of the third energizing spring 15 to the first position (corresponding to the top position) shown in FIGS. 3, 5, and 6. At this point, the energizing force of the first energizing spring 13 causes the first clutch 31 and the second clutch 32 to move integrally in the direction of the shift key 100 until the second energizing spring 14 hits the shift key 100 and equilibrium is reached with the spring force of the first energizing spring. FIGS. 5 and 6 show the clutch 30 in its first position. Here, FIG. 5 shows a state in which the drive force corresponding to the forward pedalling direction does not act upon the first clutch 31 of the clutch 30, and FIG. 6 shows a state in which the drive force corresponding to the forward pedalling direction does act upon the first clutch 31.

Figure 9A:
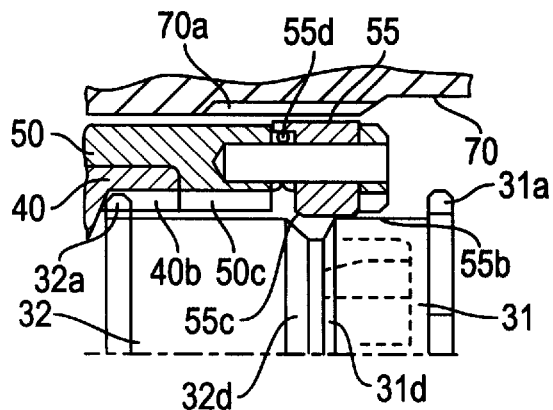
FIG 9a and 9b are partial cross sectional view of the positional relationship between the transmission pawl and clutch in the state shown in FIG. 5.
Figure 9B:
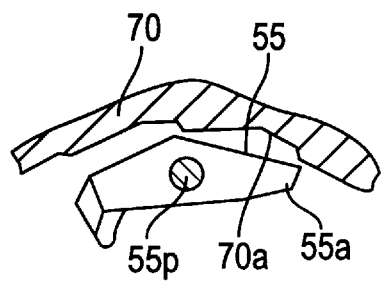

Specifically, in the state shown in FIG. 5 and FIGS. 9(a) and 9(b), the first clutch 31 is energized by the first energizing spring 13 toward the second clutch 32, the contact surface 55b of the transmission pawl 55 is pushed up by the first contact surface 31d of the first clutch 31, the transmission pawl 55 swings about its linking pin 55p, and the pawl component 55a of the transmission pawl 55 is in a state of non-contact with the engagement teeth 70a of the hub body 70.

Figure 10A:
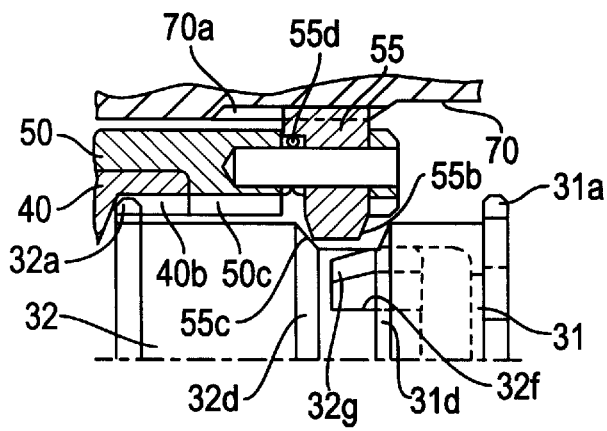
FIGS 10a and 10b are partial cross sectional view of the positional relationship between the transmission pawl and clutch in the state shown in FIG. 6.
Figure 10B:
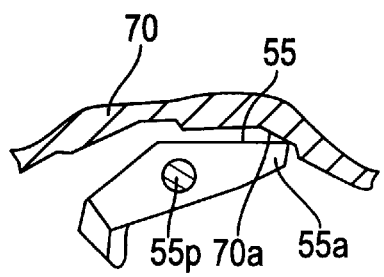

When a drive force in the forward pedalling direction (the first rotational direction) is then produced at the pedals 6, as discussed above, the end of the engagement component 31e of the first clutch 31 slides over the inclined surface 32g of the second clutch 32, and, as shown in FIG. 6 and FIGS. 10(a) and 10(b), the first clutch 31 and the second clutch 32 separate in the axial direction. In this state, the end on the contact side of the transmission pawl 55 is in a state of non-contact with the first clutch 31 and the second clutch 32, so it is raised up by the energizing spring 55d provided to the pivot shaft 55p of the transmission pawl 55. Therefore, when this state occurs, the pawl component 55a of the transmission pawl 55 is meshed with the engagement teeth 70a of the hub body 70, so power transmission is possible between the ring gear 50 and the hub body 70.

The drive force transmission path from the pedals 6 in this state is such that the power in the first rotational direction, i.e., the forward pedalling direction, from the pedals 6 is transmitted to the sprocket 20 and rotates the driver 25 to which the sprocket 20 is fixed. Then, as shown in FIG. 6, the power is transmitted to the first clutch 31 via the spline 25c of the driver 25 and the plurality of engagement pawls 31a of the first clutch 31. After this, the second clutch 32 is driven by contact between the flat surface 31b of the engagement component 31e formed on the inner peripheral surface of the first clutch 31 and the extension surface 32h of the second clutch 32. The drive force is then transmitted to the planet gear rack 40 by engagement between the engagement pawl 32a of the second clutch 32 and the serrations 40b of the planet gear rack 40. The drive force is transmitted to the ring gear member 50 by the meshing of the ring gear 50d with the planet gear 41 supported in a pivoting state by the planet gear rack 40, and the transmission pawl 55 linked to the ring gear member 50 is in an upright state, so the drive force of the ring gear member 50 is transmitted to the hub body 70 via the engagement teeth 70a (ratchet) on the inner periphery of the hub body 70.

A simplified explanation of the transmission path is as follows:

pedals 6→chain 8→sprocket 20→driver 25→first clutch 31→second clutch 32→planet gear rack 40→planet gear 41→ring gear member 50→transmission pawl 55→hub body 70→rear wheel 3.

In this manner, the drive force input from the pedals 6 is transmitted to the planet gear rack 40, and is boosted and transmitted to the ring gear member 50 by means of the revolution of the planet gear 41 around the hub axle 10 and by means of the rotation of the planet gear 41 about its pivot shaft.

Figure 7:
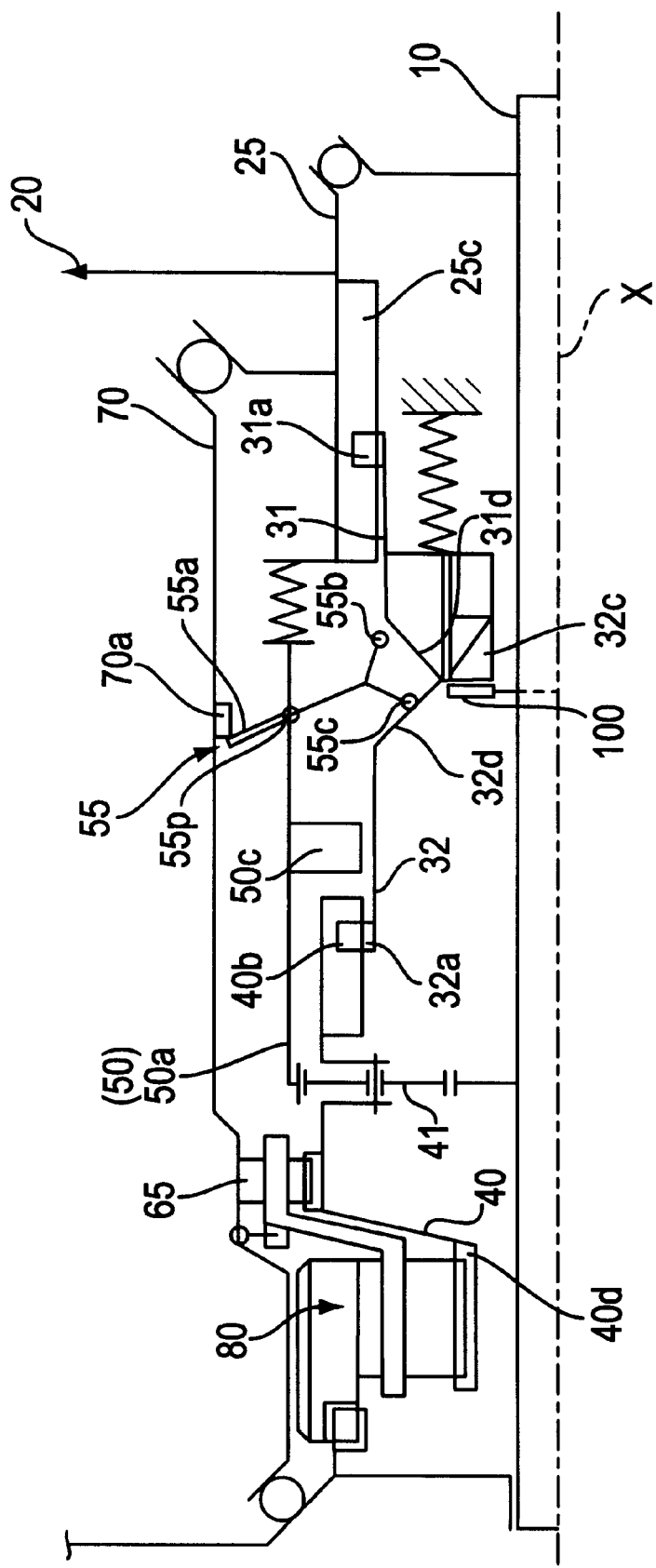
FIG 7 is a schematic representation of the transmission components in a neutral gear position
Figure 11A:
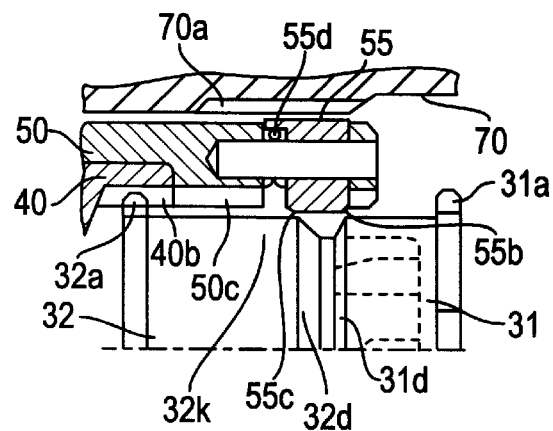
FIGS 11a and 11b are partial cross sectional view of the positional relationship between the transmission pawl and clutch in the state shown in FIG. 7.
Figure 11B:
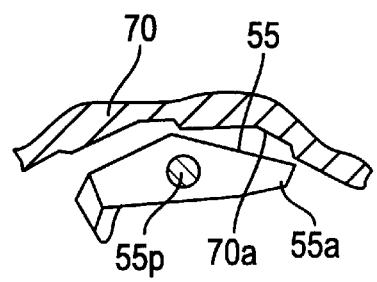

The transmission path of the power when the shifter 5 is operated and the clutch 30 is moved to the second position (neutral state) will now be described through reference to FIG. 7 and FIGS. 11(a) and 11(b).

In this case, the power transmission path is as follows:

pedals 6→chain 8→sprocket 20→driver 25→spline 25c of the driver 25→engagement pawl 31a of the first clutch 31→first clutch 31→engagement component 31e of the first clutch 31→leg component 32k of the second clutch 32→second clutch 32 engagement pawl 32a of the second clutch 32→serrations 40b of the planet gear rack 40→planet gear rack 40e engagement surface 40e of the planet gear rack 40 roller clutch mechanism 65→inner periphery engagement surface 70c of the hub body 70→hub body 70→rear wheel 3.

In this manner, the drive force input to the pedals 6 is transmitted directly to the planet gear rack 40 via the clutch 30, and it is transmitted to the hub body 70 via the roller clutch mechanism 65. The rotational speed of the driver 25 is essentially the same as the rotational speed of the hub body 70.

Figure 8:
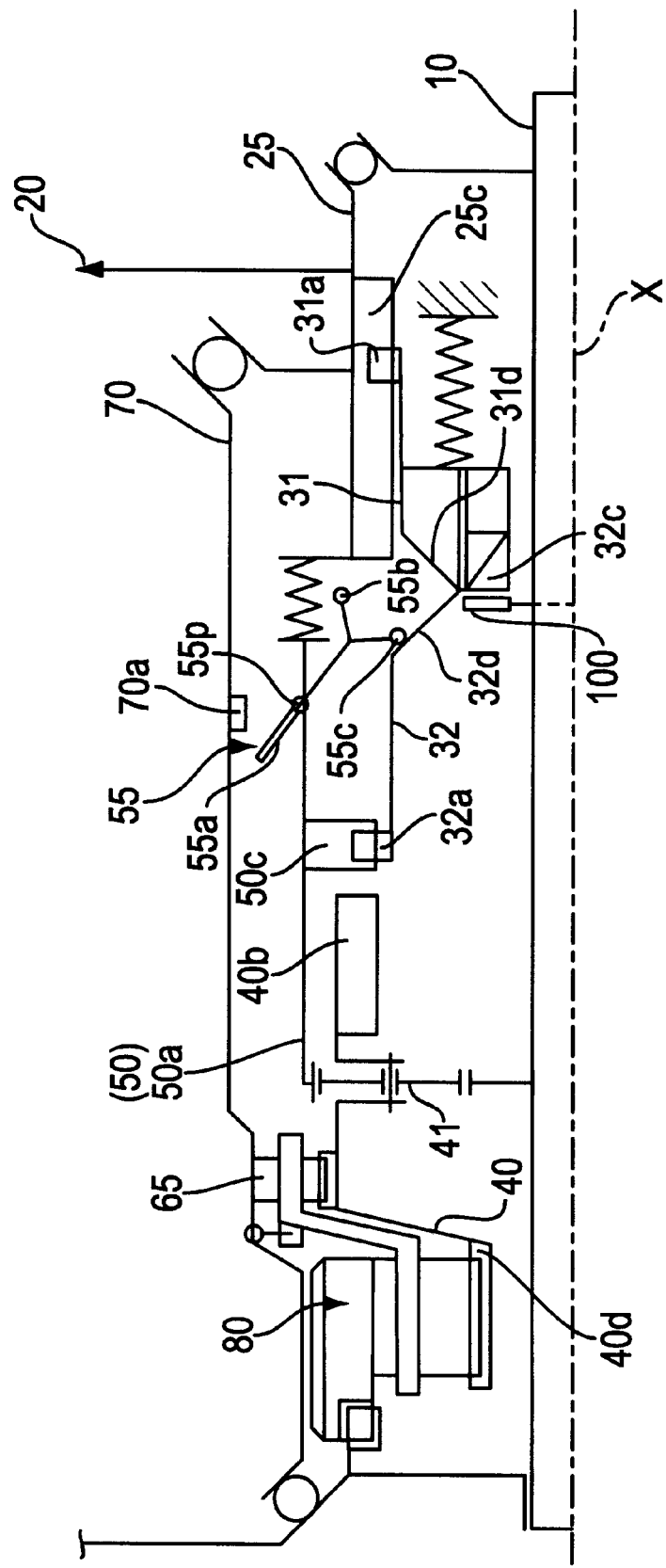
FIG 8 is a schematic representation of the transmission components in a low gear position.
Figure 12A:
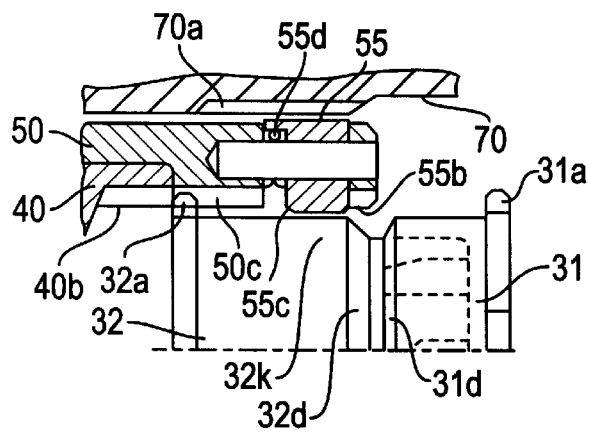
FIGS. 12a and 12b are partial cross sectional view of the positional relationship between the transmission pawl and clutch in the state shown in FIG. 8.
Figure 12B:
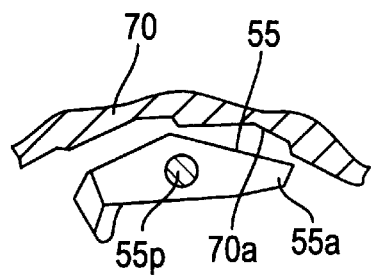
Figure 13A:
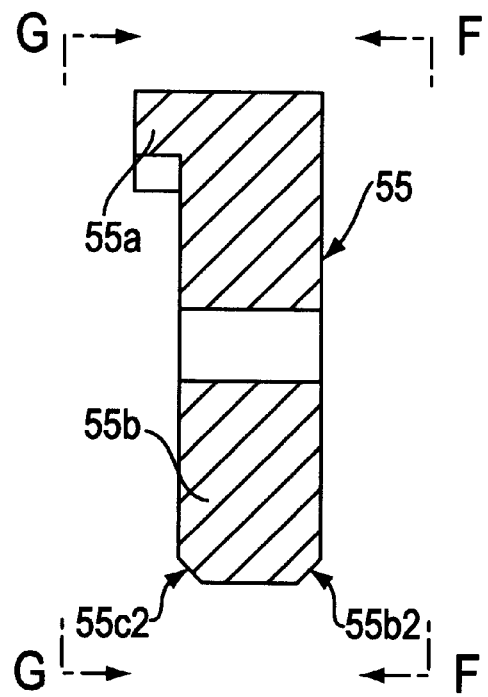
FIG. 13a is a cross sectional view of a particular embodiment of a transmission pawl according to the present invention.
Figures 13B, 13C:
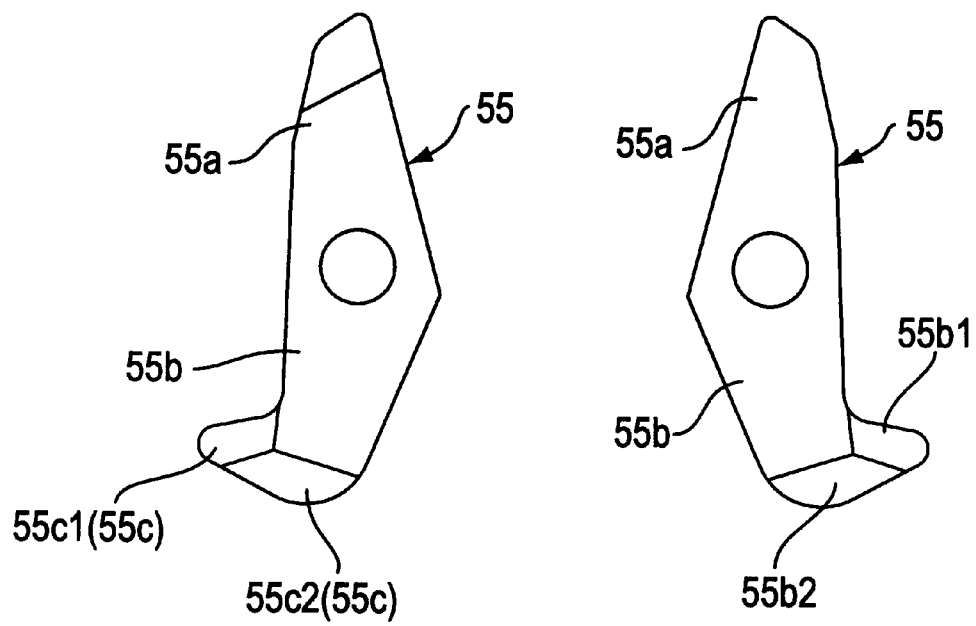

The transmission path of the power when the shifter 5 is operated and the clutch 30 is moved to the third position (low state) will now be described through reference to FIG. 8 and FIGS. 12(*a*) and 12(*b*).

In this case, the power transmission path is as follows: pedals 6→chain 8→sprocket 20→driver 25→spline 25*c* of the driver 25→engagement pawl 31*a* of the first clutch 31→first clutch 31→engagement component 31*e* of the first clutch 31→leg component 32*k* of the second clutch 32→second clutch 32→engagement pawl 32*a* of the second clutch 32→serrations 50*c* of the ring gear member 50→ring gear member 50→ring gear 50*d*→planet gear 41→pivot shaft 40*c* of the planet gear rack 40→planet gear rack 40→engagement surface 40*e* of the planet gear rack 40→roller clutch mechanism 65→inner periphery engagement surface 70*c* of the hub body 70→hub body 70→rear wheel 3.

In this manner, the drive force input via the pedals 6 is transmitted to the ring gear member 50 via the clutch 30 without being diminished, after which it is diminished by an amount corresponding to the rotation of the planet gear 41 by means of the meshing between the ring gear 50 and the planet gear 41, and rotational force is transmitted to the planet gear rack 40. The rotational force of the planet gear rack 40 is transmitted directly to the hub body 70 via the roller clutch mechanism 65.

Thus, it is possible to shift to the desired speed step by operating the shifter 5 and moving the clutch 30 between three different positions. Furthermore, as is clear from the above description, switching the transmission pawl 55 between its upright state and its reclined state by displacing the first clutch 31 in the axis X direction with respect to the second clutch 32 is possible in this embodiment only when a shift has been made to the top position corresponding to the first position. More specifically, in this embodiment, the transmission pawl 55 is designed so that it will be reclined during the reverse rotation of the driver 25.

The following problems would be encountered if the structure were such that the transmission pawl 55 would not be in a reclined state even during back pedalling. When the pedals 6 and the driver 25 are rotated backward in order to actuate the coaster brake, the brake is applied and the hub body 70 can no longer be rotated. If the transmission pawl 55 at this point is in an upright state and is engaged with the hub body 70, then when an attempt is made to rotate the pedals 6 forward in an effort to release the brake, rotation of the hub body 70 will be impossible because the driver 25 will be engaged with the hub body 70. Consequently, the brake cannot be released, resulting in the problem of so-called brake lock. Also, even on a bicycle not equipped with a coaster brake, if the transmission pawl 55 is in contact with the hub body 70 during the reverse rotation of the driver 25, then the transmission pawl 55 will be in contact with the hub body 70 and generate noise.

In this embodiment, in a state in which the drive force corresponding to the first rotational direction in the top position does not come into play and the first clutch 31 is pushed toward the second clutch 32 by the first energizing spring 13, that is, in a state in which the clutch 30 is retracted in the axis X direction, since the transmission pawl 55 is in a reclined state, there will be no contact between the transmission pawl 55 and the hub body 70 even if the pedals 6 are rotated backward in this state. As a result, the problem of brake lock will not be encountered.

In a state in which the drive force corresponding to the first rotational direction in the top position does come into play and the first clutch 31 is separated from the second clutch 32 in the axial direction, that is, in a state of extension of the clutch 30, since the first clutch 31 moves in the direction of the second clutch 32 when the drive force in the reverse direction acts upon the pedals 6, the transmission pawl 55 changes to a reclined state. Consequently, the problem of brake lock will not be encountered even if the pedals 6 are rotated backward in this state. Further, no noise is generated in a bicycle not equipped with a coaster brake.

While the above is a description of various embodiments of the present invention, further modifications may be employed without departing from the spirit and scope of the present invention. Thus, the scope of the invention should not be limited by the specific structures disclosed. Instead, the true scope of the invention should be determined by the following claims. Of course, although labeling symbols are used in the claims in order to facilitate reference to the figures, the present invention is not intended to be limited to the constructions in the appended figures by such labeling.

What is claimed is:

1. A bicycle transmission comprising:

a hub axle (10);

a drive member (25) rotatably mounted around the hub axle (10);

a hub body (70) rotatably mounted around the hub axle (10);

a planetary gear mechanism (99,40,41,50) coupled between the drive member (25) and the hub body (70) for communicating rotational force from the drive member (25) to the hub body (70) through multiple rotational force transmission paths, the planetary gear mechanism (99,40,41,50) including:

a planet gear (41) supported by a planet gear rack (40) for rotation around the hub axle (10); and a ring gear (50) engaging the planet gear (41), wherein the ring gear (50) includes a transmission pawl (55) that can be displaced between a first position for transmitting rotational motion between the ring gear (50) and the hub body (70) and a second position for inhibiting the transmission of rotational motion between the ring gear (50) and the hub body (70);

a clutch (30) mounted around the hub axle (10), wherein the clutch (30) is movable in the direction of a longitudinal axis (X) of the hub axle (10) for selecting a rotational force transmission path through the planetary gear mechanism (99,40,41,50) and for selectively operating the transmission pawl (55);

a clutch operator for operating the clutch (30);

wherein the clutch (30) includes a first clutch member (31) and a second clutch member (32) capable of movement relative to each other in the direction of the axis (X) of the hub axle (10) in response to rotation of the drive member (25); and wherein the first clutch member (31) and the second clutch member (32) move relative to each other when the drive member (25) rotates in a first rotational direction for causing the transmission pawl (55) to be in the first position for transmitting rotational motion between the ring gear (50) and the hub body (70).

2. The transmission according to claim 1 wherein the first rotational direction corresponds to a forward direction of a bicycle in which the bicycle transmission is installed.

3. A bicycle transmission comprising:

a hub axle (10):

a drive member (25) rotatable mounted around the hub axle (10):

a hub body (70) rotatable mounted around the hub axle (10):

a planetary gear mechanism (99,40,41,50) coupled between the drive member (25) and the hub body (70) for communicating rotational force from the drive member (25) to the hub body (70) through multiple rotational force transmission paths, the planetary gear mechanism (99,40,41,50) including:

a planet gear (41) supported by a planet gear rack (40) for rotation around the hub axle (10); and a ring gear (50) engaging the planet gear (41). wherein the ring gear (50) includes a transmission pawl (55) that can be displaced between a first position for transmitting rotational motion between the ring gear (50) and the hub body (70) and a second position for inhibiting the transmission of rotational motion between the ring gear (50) and the hub body (70);

a clutch (30) mounted around the hub axle (10), wherein the clutch (30) is movable in the direction of a longitudinal axis (X) of the hub axle (10) for selecting a rotational force transmission path through the planetary gear mechanism (99,40,41,50) and for selectively operating the transmission pawl (55);

a clutch operator for operating the clutch (30);

wherein the clutch (30) includes a first clutch member (31) and a second clutch member (32) capable of movement relative to each other in the direction of the axis (x) of the hub axle (10);

wherein the first clutch member (31) and the second clutch member (32) move relative to each other when the drive member (25) rotates in a first rotational direction for causing the transmission pawl (55) to be in the first position for transmitting rotational motion between the ring gear (50) and the hub body (70), wherein the first clutch member (31) includes a first engagement component (31e), wherein the second clutch member (32) includes a second engagement component (32e) having an inclined surface (32g), and wherein the first engagement component (31e) slides against the inclined surface (32g) of the second engagement component (32e) when the drive member (25) rotates in the first rotational direction to cause the first clutch member (31) and the second clutch member (32) to move relative to each other in the direction of the axis (X) of the hub axle (10).

4. The transmission according to claim 3 wherein the first clutch member (31) is coupled to drive member (25) so that the first clutch member (31) is incapable of rotation relative to the drive member but is capable of movement relative to the drive member (25) in the direction of the axis (X) of the hub axle (10).

5. The transmission according to claim 3 wherein the inclined surface (32g) of the second engagement component is shaped so that the first clutch member (31) and the second clutch member (32) move away from each other in the direction of the axis (X) of the hub axle (10) when the drive member (25) rotates in the first rotational direction.

6. The transmission according to claim 5 wherein the inclined surface (32g) of the second engagement component is shaped so that the first clutch member (31) and the second clutch member (32) move toward each other in the direction of the axis (X) of the hub axle (10) when the drive member (25) rotates in a second rotational direction.

7. A bicycle transmission comprising:

a hub axle (10);

a drive member (25) rotatable mounted around the hub axle (10);

a hub body (70) rotatable mounted around the hub axle (10);

a planetary gear mechanism (99,40.41.50) coupled between the drive member (25) and the hub body (70) for communicating rotational force from the drive member (25) to the hub body (70) through multiple rotational force transmission paths, the planetary gear mechanism (99,40,41,50) including:

a planet gear (41) supported by a planet gear rack (40) for rotation around the hub axle (10); and a ring gear (50) engaging the planet gear (41), wherein the ring gear (50) includes a transmission pawl (55) that can be displaced between a first position for transmitting rotational motion between the ring gear (50) and the hub body (70) and a second position for inhibiting the transmission of rotational motion between the ring gear (50) and the hub body (70);

a clutch (30) mounted around the hub axle (10), wherein the clutch (30) is movable in the direction of a longitudinal axis (X) of the hub axle (10) for selecting a rotational force transmission path through the planetary gear mechanism (99,40,41,50) and for selectively operating the transmission pawl (55;

a clutch operator for operating the clutch (30);

wherein the clutch (30) includes a first clutch member (31) and a second clutch member (32) capable of movement relative to each other in the direction of the axis (X) of the hub axle (10);

wherein the first clutch member (31) and the second clutch member (32) move relative to each other when the drive member (25) rotates in a first rotational direction for causing the transmission pawl (55) to be in the first position for transmitting rotational motion between the ring gear (50) and the hub body (70);

wherein the first clutch member (31) includes a first contact surface (31d) for contacting the transmission pawl (55) and causing the transmission pawl (55) to be in the second position, and wherein the second clutch member (32) includes a second contact surface (32d) for contacting the transmission pawl (55) and causing the transmission pawl (55) to be in the second position.

8. The bicycle transmission according to claim 7 wherein, when the drive member (25) is not rotating in the first rotational direction, at least one of the first contact surface (31d) or the second contact surface (32d) contacts the transmission pawl (55) to cause the transmission pawl (55) to be in the second position.

9. The bicycle transmission according to claim 8 wherein, when the drive member (25) is rotating in a second rotational direction, at least one of the first contact surface (31d) or the second contact surface (32d) contacts the transmission pawl (55) to cause the transmission pawl (55) to be in the second position.

10. The bicycle transmission according to claim 8 wherein, when the drive member (25) rotates in the first rotational direction, neither the first contact surface (31d) nor the second contact surface (32d) contacts the transmission pawl (55), thereby causing the transmission pawl (55) to be in the first position.

11. The bicycle transmission according to claim 10 wherein neither the first contact surface (31d) nor the second contact surface (32d) contacts the transmission pawl (55) only when a predetermined rotational force transmission path through the planetary gear mechanism (99,40,41,50) is selected.

12. The bicycle transmission according to claim 11 wherein the predetermined rotational force transmission path corresponds to a top gear transmission path.

13. The transmission according to claim 10 wherein the first clutch member (31) includes a first engagement component (31e), wherein the second clutch member (32) includes a second engagement component (32e) having an inclined surface (32g), and wherein the first engagement component (31e) slides against the inclined surface (32g) of the second engagement component (32e) when the drive member (25) rotates in the first rotational direction to cause the first clutch member (31) and the second clutch member (32) to move away from each other in the direction of the axis (X) of the hub axle (10) so that neither the first contact surface (31d) nor the second contact surface (32d) contacts the transmission pawl (55), thereby causing the transmission pawl (55) to be in the first position.

14. The transmission according to claim 13 wherein the inclined surface (32g) of the second engagement component is shaped so that the first clutch member (31) and the second clutch member (32) move toward each other in the direction of the axis (X) of the hub axle (10) when the drive member (25) rotates in a second rotational direction so that at least one of the first contact surface (31d) or the second contact surface (32d) contacts the transmission pawl (55) to cause the transmission pawl (55) to be in the second position.

15. The bicycle transmission according to claim 7 wherein one end (55a) of the transmission pawl (55) is structured for engaging ratchet teeth (70a) formed on the hub body (70) when the transmission pawl (55) is in the first position, and wherein an opposite end (55b) of the transmission pawl (55) is structured for contacting the first contact surface (31d) of the first clutch member (31) and the second contact surface (32d) of the second clutch member (32).

16. The bicycle transmission according to claim 15 further comprising a biasing mechanism (55d) for biasing the transmission pawl (55) toward the first position.

* * * * *